(12) United States Patent
Yamashiro et al.

(10) Patent No.: US 12,355,046 B2
(45) Date of Patent: *Jul. 8, 2025

(54) BATTERY MODULE

(71) Applicant: SANYO Electric Co., Ltd., Kadoma (JP)

(72) Inventors: Go Yamashiro, Hyogo (JP); Shingo Ochi, Hyogo (JP)

(73) Assignee: SANYO Electric Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/654,294

(22) Filed: May 3, 2024

(65) Prior Publication Data

US 2024/0283051 A1 Aug. 22, 2024

Related U.S. Application Data

(63) Continuation of application No. 17/267,461, filed as application No. PCT/JP2019/029349 on Jul. 26, 2019, now Pat. No. 12,009,496.

(30) Foreign Application Priority Data

Sep. 20, 2018 (JP) ................................ 2018-175616

(51) Int. Cl.
*H01M 50/204* (2021.01)
*H01M 10/613* (2014.01)
(Continued)

(52) U.S. Cl.
CPC ..... *H01M 10/6555* (2015.04); *H01M 10/613* (2015.04); *H01M 10/647* (2015.04);
(Continued)

(58) Field of Classification Search
CPC ............. H01M 50/204; H01M 50/209; H01M 50/289; H01M 10/653; H01M 10/647; H01M 10/613
See application file for complete search history.

(56) References Cited

U.S. PATENT DOCUMENTS 12,009,496 B2 * 6/2024 Yamashiro .......... H01M 10/613
2009/0111010 A1 4/2009 Okada et al.
(Continued)

FOREIGN PATENT DOCUMENTS

CN 206059484 U 3/2017
JP 2009-110833 A 5/2009
(Continued)

OTHER PUBLICATIONS

The Extended European Search Report dated Nov. 2, 2021, issued in counterpart EP Application No. 19863562.5. (8 pages).
(Continued)

*Primary Examiner* — Olatunji A Godo
(74) *Attorney, Agent, or Firm* — WHDA, LLP

(57) ABSTRACT

The battery module includes a plurality of batteries stacked together, and separator disposed between an adjoining two of the plurality of batteries and configured to insulate between the adjoining two of batteries. Separator includes thermal conduction suppressor and position regulator. Thermal conduction suppressor has lower thermal conductivity than position regulator and suppresses thermal conduction between the adjoining two of batteries. Position regulator has higher rigidity than thermal conduction suppressor, has dimension in stacked direction of batteries equal to or greater than dimension of thermal conduction suppressor in stacked direction, and abuts the adjoining two of batteries to regulate a position of each of the adjoining two of batteries in stacked direction.

16 Claims, 7 Drawing Sheets

(51) Int. Cl.
  *H01M 10/647* (2014.01)
  *H01M 10/653* (2014.01)
  *H01M 10/6555* (2014.01)
  *H01M 50/209* (2021.01)
  *H01M 50/289* (2021.01)

(52) U.S. Cl.
  CPC ....... *H01M 10/653* (2015.04); *H01M 50/204* (2021.01); *H01M 50/209* (2021.01); *H01M 50/289* (2021.01)

(56) References Cited

U.S. PATENT DOCUMENTS

| | | |
|---|---|---|
| 2019/0190098 A1 | 6/2019 | Abe |
| 2020/0058912 A1 | 2/2020 | Kuramitsu et al. |

FOREIGN PATENT DOCUMENTS

| | | |
|---|---|---|
| JP | 2012-181972 A | 9/2012 |
| WO | 2018061894 A1 | 4/2018 |
| WO | 2018/110055 A1 | 6/2018 |
| WO | 2019/155713 A1 | 8/2019 |

OTHER PUBLICATIONS

International Search Report of PCT application No. PCT/JP2019/029349 dated Oct. 29, 2019.

\* cited by examiner

BATTERY MODULE

CROSS REFERENCE TO RELATED APPLICATIONS

This application is a Continuation of U.S. patent application Ser. No. 17/267,461, filed Feb. 9, 2021, which is a National Stage Entry of International Application No. PCT/JP2019/029349 filed Jul. 26, 2019, which claims the benefit of Japanese Patent Application No. 2018-175616 filed in the Japan Patent Office on Sep. 20, 2018, each of which is incorporated by reference herein in its entirety.

TECHNICAL FIELD

The present invention relates to a battery module.

BACKGROUND ART

A battery module, having a structure where a plurality of batteries are connected in series, is known as a power supply for a vehicle or the like, the power source required for a high output voltage. PTL 1 discloses a battery module having a structure where batteries and separators are alternately stacked. The battery module has each of the separators disposed between an adjoining two of the batteries to insulate between the adjoining two.

CITATION LIST

Patent Literature

PTL 1: Unexamined Japanese Patent Publication No. 2012-181972

SUMMARY OF THE INVENTION

In the battery module described above, each of the batteries in use may be excessively increased in temperature, and the heat may be conducted to one adjoining the corresponding battery, causing the one to be excessively increased in temperature too, in other words, "a chain of overheating". The chain of overheating causes significant degradation in performance of the battery module. Further, when the batteries stacked are not sufficiently fixed in the battery module, it is difficult to maintain each of the batteries electrically connected to the others, thereby leading to the degradation in performance of the battery module.

As a result of earnest and constant research on the battery module described above, the inventors of this application have come to recognize that a conventional battery module is required of further improvement to suppress the degradation in performance of the battery module.

In view of these respects, an object of the present invention is to provide a technique to suppress the degradation in performance of the battery module.

An aspect of the present invention provides a battery module. The battery module includes a plurality of batteries stacked together, and a separator disposed between an adjoining two of the plurality of batteries and configured to insulate between the adjoining two of the batteries. The separator includes a thermal conduction suppressor and a position regulator. The thermal conduction suppressor has lower thermal conductivity than the position regulator and suppresses thermal conduction between the adjoining two of the batteries. The position regulator has greater rigidity than the thermal conduction suppressor, has a dimension in a stacked direction of the batteries equal to or greater than a dimension of the thermal conduction suppressor in the stacked direction, and abuts the adjoining two of the batteries to regulate a position of each of the adjoining two of the batteries in the stacked direction.

It should be noted that any combinations of configuration elements above and translation of descriptions of the present invention in methods, devices, systems, and others are encompassed within an aspect of the present invention.

The present invention is to provide a technique to suppress degradation in performance of a battery module.

DESCRIPTION OF EXEMPLARY EMBODIMENTS

Preferred exemplary embodiments of the present invention will be described below with reference to the drawings. It is to be understood that the exemplary embodiments below are merely illustrative and are not restrictive. Thus, any one of features or combination of features described in the exemplary embodiments is not restrictive of the present invention. In each of the drawings, same reference marks represent identical or equivalent constituent elements, members, and processes, and a detailed description thereof will be omitted as appropriate. A feature of each component illustrated in each of the drawings, such as a scale or a shape, is simply for convenience of description and, unless otherwise stated, is not intended to limit the scope of the present invention. Additionally, the terminology used in this description or claims, such as "first" or "second", is simply for purpose of distinguishing one component from another and, unless otherwise stated, is in no way intended to indicate any order or importance. Further, each of the drawings illustrates a principal configuration of the exemplary embodiment, and the illustration of some members is omitted.

First Exemplary Embodiment

Figure 1:
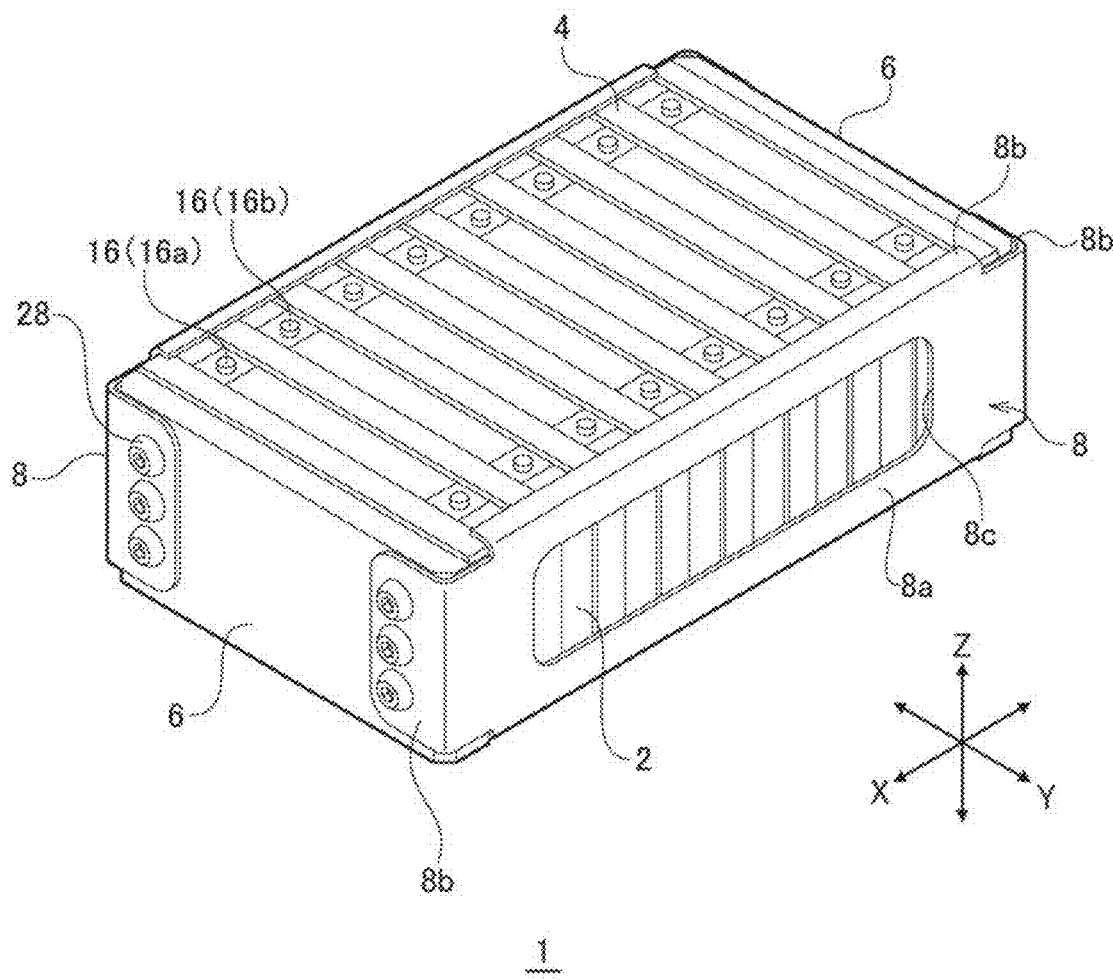
FIG. 1 is a perspective view of a battery module according to a first exemplary embodiment.
Figure 2:
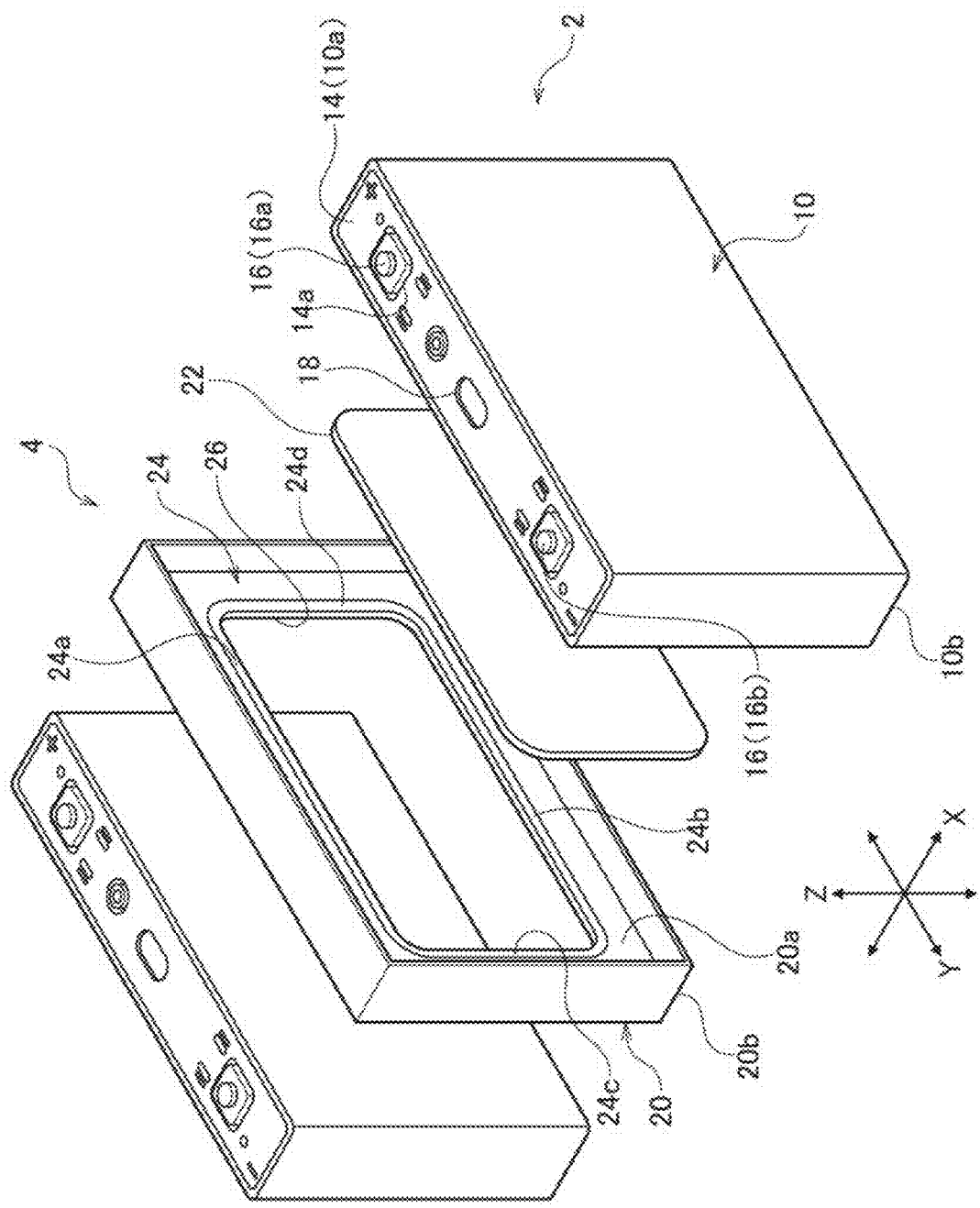
FIG. 2 is an exploded perspective view of the battery and the separator.
Figure 3:
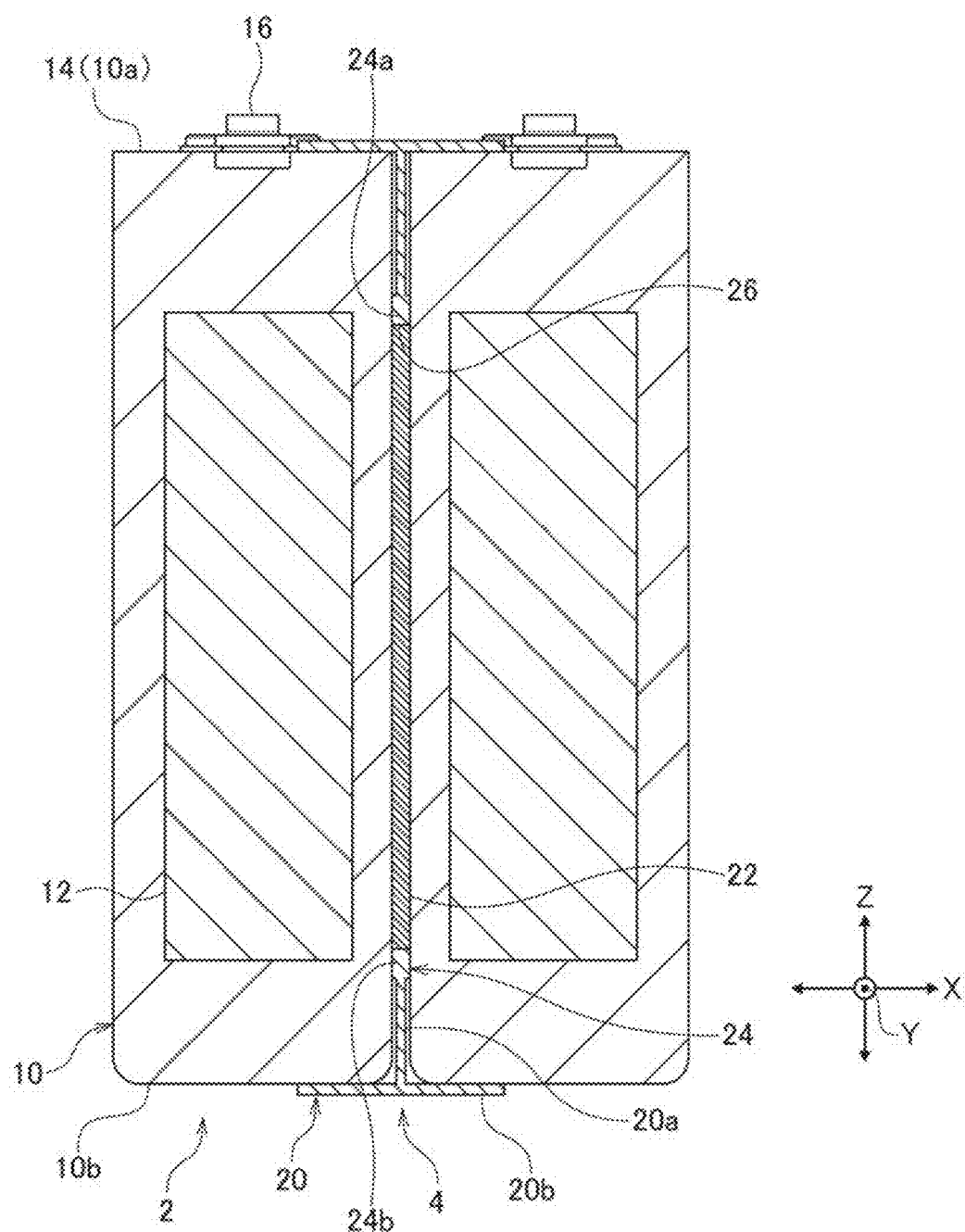
FIG. 3 is a sectional view of the battery and the separator assembled to each other.
Figure 4:
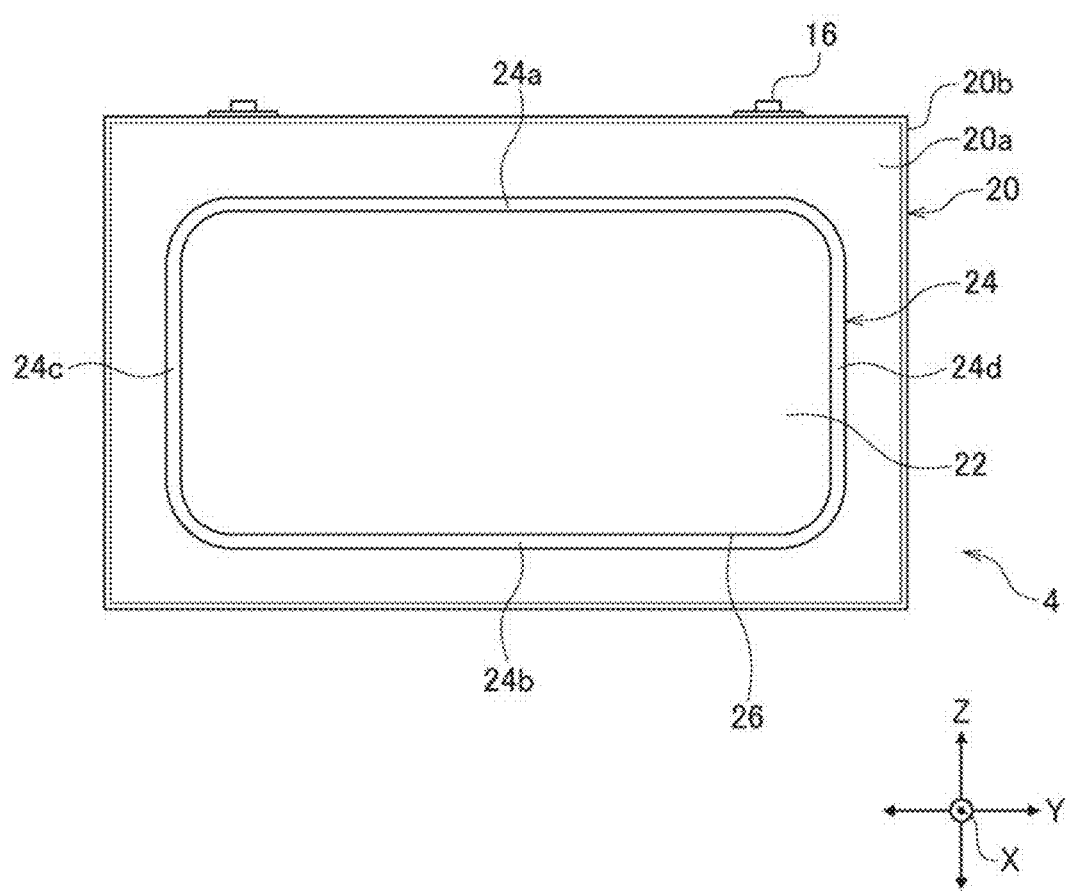
FIG. 4 is a front view of the separator assembled to the battery.

FIG. 1 is a perspective view of a battery module according to a first exemplary embodiment. FIG. 2 is an exploded perspective view of the battery and the separator. FIG. 3 is a sectional view of the battery and the separator assembled to each other. FIG. 4 is a front view of the separator assembled to the battery. Note that, FIG. 1 illustrates a simplified form of battery 2. Each of FIGS. 2 and 3 illustrates any two of batteries 2, and separator 4 disposed between the two of batteries 2. FIG. 3 schematically illustrates electrode body 12 only in an internal structure of each of batteries 2.

Battery module 1 mainly includes a plurality of batteries 2, a plurality of separators 4, a pair of end plates 6, and a pair of binding members 8.

Each of batteries 2 is, for example, a rechargeable secondary battery, such as a lithium ion battery, a nickel-hydrogen battery, or a nickel-cadmium battery. Each of batteries 2 is a typically-called square battery, and includes outer can 10 of a flat rectangular parallelepiped shape. Outer can 10 includes, on its one surface, an opening (not illustrated) of a substantially rectangular shape. In outer can 10, electrode body 12, electrolyte, and the like are accommodated through the opening. Outer can 10 has sealing plate 14 provided on the opening such that outer can 10 is sealed. Sealing plate 14 is a rectangular plate. Sealing plate 14 corresponds to first surface 10a of outer can 10.

First surface 10a of outer can 10, i.e., sealing plate 14, has, near its one end in a longitudinal direction, output terminal 16 of positive polarity; and sealing plate 14 has, near its other end in the longitudinal direction, output terminal 16 of negative polarity. A pair of output terminals 16 are electrically connected, respectively, to a positive electrode plate and a negative electrode plate. The positive electrode plate and the negative electrode plate are both included in electrode body 12. Hereinafter, as appropriate, output terminal 16 of positive polarity will be referred to as positive electrode terminal 16a, and output terminal 16 of negative polarity will be referred to as negative electrode terminal 16b. When not required to distinguish the polarity of output terminal 16, positive electrode terminal 16a and negative electrode terminal 16b will be collectively referred to as output terminal 16. Each of outer can 10, sealing plate 14, and output terminal 16 is a conductor made of, for example, metal. Sealing plate 14 and the opening of outer can 10 are bonded by welding or the like. Output terminals 16 are respectively inserted into through holes 14a in sealing plate 14. Each of output terminals 16 and a corresponding one of through holes 14a have an insulating sealing member interposed therebetween.

In this exemplary embodiment, for convenience of description, first surface 10a of outer can 10 corresponds to an upper surface of battery 2, and second surface 10b of outer can 10 opposing first surface 10a corresponds to a bottom surface of battery 2. Battery 2 further includes two main surfaces connecting the upper surface and the bottom surface. These two main surfaces out of six surfaces of battery 2 are greater in area than the other four surfaces. Each of these main surfaces corresponds to a longer side surface connected to the upper surface and the bottom surface along a longer side of the upper surface and a longer side of the bottom surface. Battery 2 includes the upper surface, the bottom surface, and the two main surfaces, in addition to two remaining surfaces as side surfaces. Each of these side surfaces corresponds to a shorter side surface connected to the upper surface and the bottom surface along a shorter side of the upper surface and a shorter side of the bottom surface. Directions and positions described herein are specified for convenience of description. Accordingly, in the present invention, a part specified, for example, as the upper surface is not necessarily positioned above a part specified as the bottom surface.

Sealing plate 14 has safety valve 18 between the pair of output terminals 16. Safety valve 18 is configured to open when an internal pressure of outer can 10 rises above a predetermined value, so as to release the internal gas. In each of batteries 2, safety valve 18 is connected to a gas duct (not illustrated), and the gas inside a corresponding one of batteries 2 is discharged from safety valve 18 to the gas duct.

The plurality of batteries 2 are stacked at a predetermined distance from each other such that the main surfaces of an adjoining two of batteries 2 oppose each other. Note that, "stack" corresponds to arranging a plurality of members in any one direction. Accordingly, as stacking of batteries 2, the plurality of batteries 2 may be aligned horizontally. Batteries 2 are disposed such that output terminals 16 face in a same direction. In this exemplary embodiment, for convenience of description, each of batteries 2 is disposed such that output terminals 16 face upward in a vertical direction. The adjoining two of batteries 2 are stacked such that positive electrode terminal 16a of one of the adjoining two adjoins negative electrode terminal 16b of the other of the adjoining two. Positive electrode terminal 16a and negative electrode terminal 16b are electrically connected via a bus bar (not illustrated). Note that, output terminals 16 of the same polarity in each adjoining two may be connected in parallel via the bus bar to form a battery block, and each of the battery blocks may be connected in series to the others.

Each of separators 4, also referred to as an insulating spacer, is disposed between the adjoining two of batteries 2 so as to insulate between the adjoining two of batteries 2. Each of separators 4 includes frame 20, thermal conduction suppressor 22, and position regulator 24.

Frame 20 is made of, for example, a resin having insulating properties. The resin of which frame 20 is made is, for example, a thermoplastic resin such as polypropylene (PP), polybutylene terephthalate (PBT), polycarbonate (PC), or Noryl (registered trademark) resin (modified PPE). Frame 20 includes flat surface 20a and wall 20b. Flat surface 20a is parallel to the main surfaces of battery 2, and wall 20b extends from an end of flat surface 20a in stacked direction X of batteries 2. In this exemplary embodiment, flat surface 20a and wall 20b are integrally molded.

Flat surface 20a has a same rectangular shape as the main surfaces of battery 2. Flat surface 20a is interposed between the main surfaces of the adjoining two of batteries 2, the main surfaces opposing each other. With this configuration, outer cans 10 of the adjoining two of batteries 2 are insulated from each other.

Wall 20b covers a part of each of the upper surface, the bottom surface, and the side surfaces of battery 2. With this configuration, a short circuit, which may be caused by condensation or the like on each of batteries 2 or end plates 6, is less prone to occur between the adjoining two of batteries. In other words, wall 20b secures a creepage distance between the adjoining two of batteries 2. Further, when battery module 1 has been assembled, wall 20b is positioned between each of batteries 2 and binding member 8. With this configuration, the short circuit is less prone to occur between each of batteries 2 and binding member 8.

Thermal conduction suppressor 22 is disposed between the adjoining two of batteries 2 and suppresses thermal conduction between the adjoining two of batteries 2. Thermal conduction suppressor 22 has insulating properties. In this exemplary embodiment, each of separators 4 includes through hole 26 penetrating flat surface 20a in stacked direction X of batteries 2. Thermal conduction suppressor 22 is fitted into through hole 26. In other words, thermal conduction suppressor 22 is disposed inside through hole 26 when viewed in stacked direction X. Thermal conduction suppressor 22 and through hole 26 are approximately equal in dimension in vertical direction Z, in which the upper surface and the bottom surface of each of batteries 2 are aligned. Concurrently, thermal conduction suppressor 22 and through hole 26 are approximately equal in dimension in horizontal direction Y, in which positive electrode terminal 16a and negative electrode terminal 16b are aligned. With this configuration, when viewed in stacked direction X, thermal conduction suppressor 22 extends over an entire area of through hole 26.

Thermal conduction suppressor 22 has a sheet-shape, and includes, for example, a thermal insulating material and a laminated film. Thermal conduction suppressor 22 has a thickness of, for example, 1 mm to 2 mm.

Thermal insulating material has a sheet-shaped structure where a porous material such as silica xerogel is supported between fibers of a fiber sheet of a nonwoven fabric or the like. The silica xerogel has a nano-sized porous structure that regulates a movement of air molecules, and has low thermal conductivity. The thermal insulating material has thermal conductivity of 0.018 W/m·K to 0.024 W/m·K. The thermal insulating material is particularly usable as a thermal insulating material in a narrow space. The thermal insulating material is lower in thermal conductivity than air. Thus, with thermal conduction suppressor 22 provided between the adjoining two of batteries 2, it is possible to suppress the thermal conduction between the adjoining two more effectively than with an air layer between the adjoining two as a thermal insulating layer. Further, thermal conduction suppressor 22 is lower in thermal conductivity than frame 20 and position regulator 24.

The silica xerogel stably maintains the structure against external pressure. Thus, even when being tightened by binding members 8 in stacked direction X, the thermal insulating material stably maintains the thermal performance. With thermal conduction suppressor 22 provided between each adjoining two of batteries 2, battery module 1 suppresses the thermal conduction between the adjoining two more stably than with the air layer between the adjoining two as the thermal insulating layer. Further, the thermal insulating material is lower in thermal conductivity than the air so that, in order to provide equivalent thermal insulation, the thermal insulating material may be thinner than the air layer. Accordingly, battery module 1 is less required to be increased in size.

The laminated film is a member configured to cover and protect an entire part of the thermal insulating material. With the laminated film, the porous material in the thermal insulating material is less prone to come off from the fiber sheet. Additionally, with the laminated film covering the thermal insulating material, thermal conduction suppressor 22 is easily bonded to outer can 10 in assembling of battery module 1. The laminated film is made of, for example, polyethylene terephthalate (PET) or the like.

Thermal conduction suppressor 22 is greater in heat resistance than frame 20 and position regulator 24. More specifically, the thermal insulating material is greater in heat resistance than frame 20 and position regulator 24. Still more specifically, the fiber sheet contains fibers having a higher melting point than frame 20 and position regulator 24, and/or the porous material is made of a substance having the higher melting point than frame 20 and position regulator 24. The thermal insulating material has a melting point of, for example, 300° C. or more. Specifically, the fiber sheet and/or the porous material included in the thermal insulating material have the melting point of 300° C. or more. Particularly, the fibers contained in the fiber sheet preferably have the melting point of 300° C. or more. With this configuration, even when exposed at higher temperature, the thermal insulating material maintains the structure where the porous material is supported in the fiber sheet.

With thermal conduction suppressor 22 greater in heat resistance than frame 20 and position regulator 24, even when frame 20 and position regulator 24 are melted by heat generated from each of batteries 2, thermal conduction suppressor 22 remains. With this configuration, even when frame 20 and position regulator 24 are melted, thermal conduction suppressor 22 maintains the insulated state between batteries 2. Additionally, it is possible to suppress the thermal conduction between each adjoining two of batteries 2 for a longer period.

Position regulator 24 has greater rigidity than thermal conduction suppressor 22, and abuts each adjoining two of batteries 2 to regulate a position of the adjoining two of batteries 2 in stacked direction X. Position regulator 24 is made of the same resin as frame 20. In this exemplary embodiment, position regulator 24 and frame 20 are integrally molded.

Position regulator 24 includes first part 24a and second part 24b. First part 24a is disposed closer to first surface 10a of outer can 10, and second part 24b is closer to second surface 10b of outer can 10. Each of first part 24a and second part 24b is elongated, extending in a second direction intersecting a first direction in which first surface 10a and second surface 10b aligned. In this exemplary embodiment, the first direction corresponds to vertical direction Z and the second direction corresponds to horizontal direction Y.

Position regulator 24 also includes third part 24c and fourth part 24d. Each of third part 24c and fourth part 24d is elongated. Third part 24c extends in the first direction to connect one end of first part 24a and one end of second part 24b. Fourth part 24d extends in the first direction to connect the other end of first part 24a and the other end of second part 24b.

Position regulator 24 of this exemplary embodiment is disposed to surround through hole 26. Specifically, through hole 26 is edged by first part 24a, second part 24b, third part 24c, and fourth part 24d. As has been described above, thermal conduction suppressor 22 is disposed inside through hole 26 when viewed in stacked direction X. Accordingly, thermal conduction suppressor 22 is disposed between first part 24a and second part 24b. Concurrently, thermal conduction suppressor 22 is disposed between third part 24c and fourth part 24d.

The plurality of batteries 2 and the plurality of separators 4, having been alternately stacked, are sandwiched between the pair of end plates 6. Each of end plates 6 is made of, for example, a metal plate. The pair of end plates 6 are respectively disposed to adjoin batteries 2 at both ends in stacked direction X, and a known separator is interposed between end plates 6 and batteries 2. The known separator does not include thermal conduction suppressor 22. With this configuration, end plates 6 and batteries 2 are insulated from each other, thereby preventing heat dissipation from batteries 2 through end plates 6. Each of end plates 6 has, on its surface opposite the main surface of a corresponding one of batteries 2, a screw hole (not illustrated) into which screw 28 is to be screwed.

Each of the pair of binding members 8 is also referred to as a "bind bar", and is an elongated member extending in stacked direction X as a longitudinal direction. The pair of binding members 8 are disposed to oppose each other in horizontal direction Y that is orthogonal to stacked direction X and parallel to the longitudinal direction of sealing plate 14. The pair of binding members 8 have the plurality of batteries 2, the plurality of separators 4, and the pair of end plates 6 interposed therebetween. Each of the pair of binding members 8 includes flat surface 8a and eaves 8b. Flat surface 8a has a rectangular shape and extends parallel to side surfaces of batteries 2, and each of eaves 8b, a number of which is four, protrudes from an end of flat surface 8a toward batteries 2. Two of eaves 8b oppose each other in stacked direction X, and each of the two of eaves 8b includes a through hole (not illustrated) into which screw 28 is to be inserted.

Each of flat surfaces 8a includes an opening 8c to expose the side surfaces of batteries 2. Opening 8c is preferably disposed to minimize external force in stacked direction X affecting rigidity of binding members 8. With this configuration, binding members 8 may be reduced in weight while maintaining the rigidity thereof.

Battery module 1 is assembled, for example, as follows. First, separators 4 are respectively assembled to batteries 2. Specifically, first, each of frames 20 including position regulator 24 is fitted into one of batteries 2. Note that, each of separators 4 may not include frame 20, and in this case, position regulator 24 is attached to outer can 10 with adhesive or the like. Subsequently, thermal conduction suppressor 22 is attached to the main surface of outer can 10. In this state, thermal conduction suppressor 22 is disposed inside through hole 26 of frame 20. Thermal conduction suppressor 22 is attached to outer can 10 with the adhesive or the like.

The plurality of batteries 2 and the plurality of separators 4 are alternately stacked, and then are sandwiched between the pair of end plates 6 in stacked direction X, so that an assembly is formed. The assembly is sandwiched between the pair of binding members 8 in horizontal direction Y. Binding members 8 are respectively positioned such that the through holes of binding members 8 are exactly aligned with the screw holes of end plates 6. Then, screws 22 are respectively inserted into the through holes and screwed into the screw holes. With this configuration, the pair of binding members 8 are engaged with the pair of end plates 6, so that the plurality of batteries 2 and the plurality of separators 4 are bound together.

The plurality of batteries 2 are tightened in stacked direction X by binding members 8 to be positioned in stacked direction X. Further, the plurality of batteries 2 respectively have the bottom surfaces abutting eaves 8b at lower side of binding members 8 with frames 20 of separators 4 interposed between the bottom surfaces of batteries 2 and eaves 8b at the lower side. Concurrently, the plurality of batteries 2 respectively have the upper surfaces abutting eaves 8b at upper side of binding members 8 with frames 20 of separators 4 interposed between the upper surfaces of batteries 2 and eaves 8b at the upper side. With this configuration, the plurality of batteries 2 are positioned in vertical direction Z. When the positioning described above has been completed, the bus bar is attached to output terminals 16 of each of batteries 2, and output terminals 16 are electrically connected to each other. Subsequently, a cover member (not illustrated) is attached to cover the upper surface of each of batteries 2, so that battery module 1 is completed.

Figure 5:
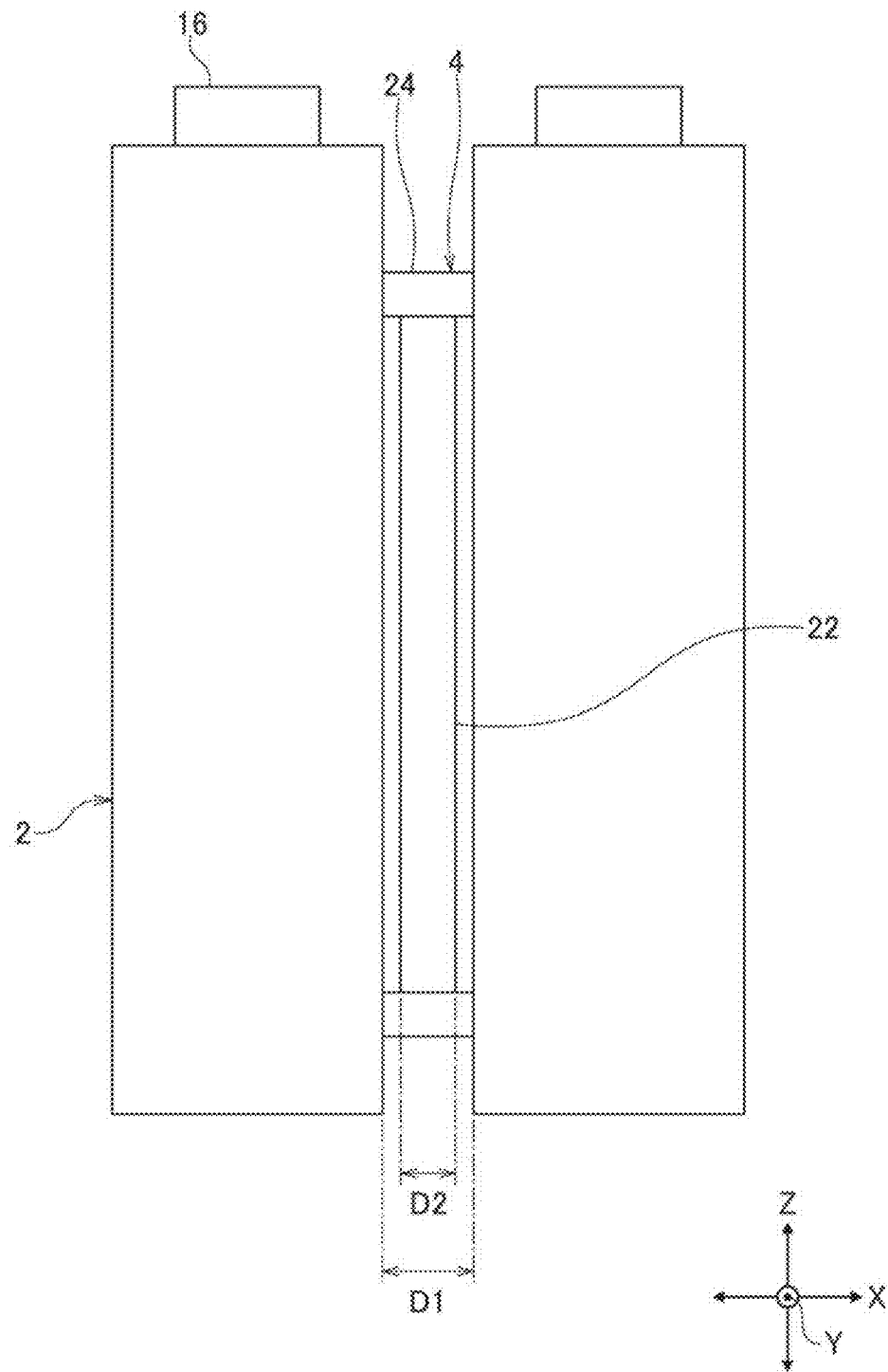
FIG. 5 is a schematic diagram illustrating a dimension of a thermal conduction suppressor and a dimension of a position regulator, each dimension in a stacked direction.

Next, a dimension of thermal conduction suppressor 22 and a dimension of position regulator 24, each of the dimensions in stacked direction X, as well as arrangement of position regulator 24 will be described in detail. FIG. 5 is a schematic diagram illustrating the dimension of the thermal conduction suppressor and the dimension of the position regulator, each of the dimensions in the stacked direction of the batteries. Dimension D1 of position regulator 24 in stacked direction X of battery 2 is equal to or greater than dimension D2 of thermal conduction suppressor 22 in stacked direction X. FIG. 5 illustrates a structure where dimension D1 of position regulator 24 is greater than dimension D2 of thermal conduction suppressor 22.

Figure 6:
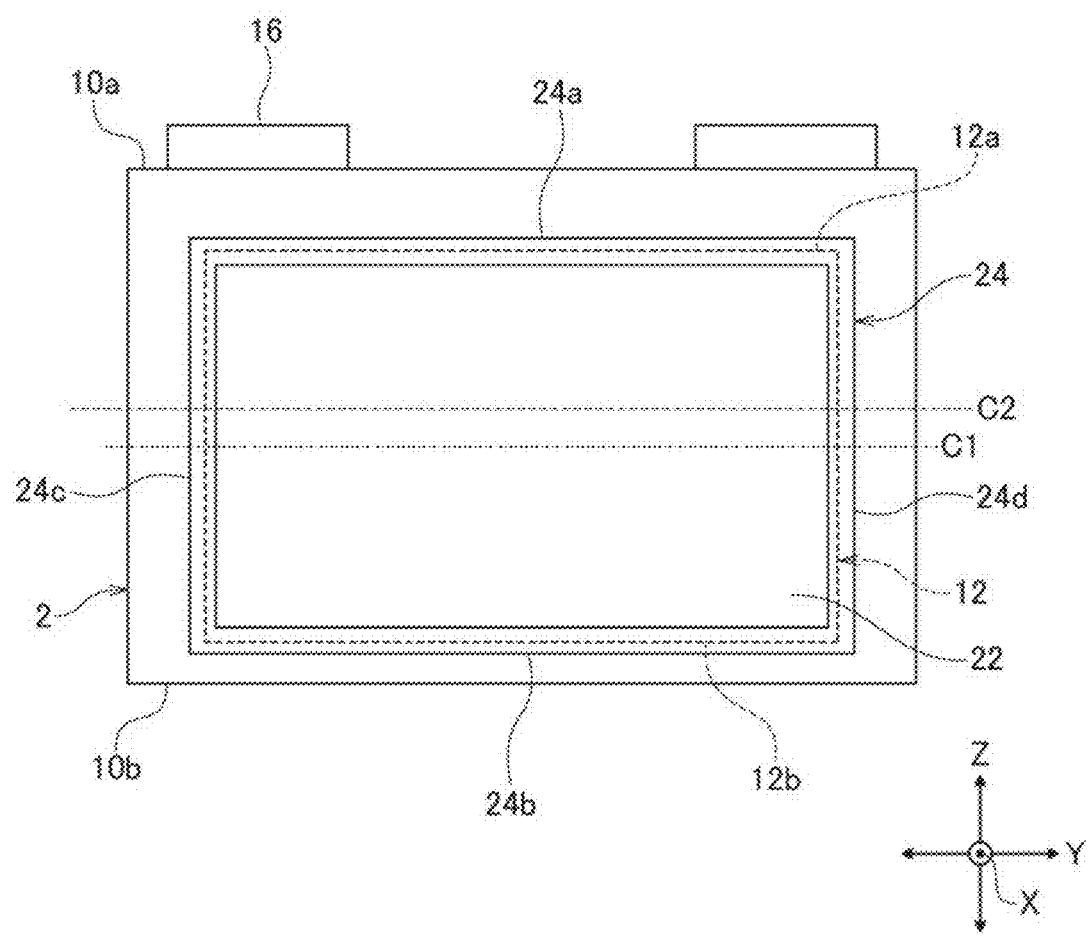
FIG. 6 is a schematic diagram illustrating arrangement of the position regulator.

FIG. 6 is a schematic diagram illustrating the arrangement of the position regulator. Position regulator 24 has center C1 in the first direction, in which first surface 10a and second surface 10b are aligned. Center C1 is placed closer to second surface 10b with respect to center C2 of battery 2 in the first direction. Center C1 of position regulator 24 corresponds to, for example, a mid-point in the first direction between a point of first part 24a closest to first surface 10a and a point of second part 24b closest to second surface 10b. Center C2 of battery 2 is placed at a mid-point in the first direction between a tip of output terminal 16 and second surface 10b.

Electrode body 12 has a rectangular shape extending in the second direction. When viewed in stacked direction X of battery 2, first part 24a overlaps longer side 12a of electrode body 12 closer to first surface 10a, and second part 24b overlaps longer side 12b of electrode body 12 closer to second surface 10b. Note that, in this exemplary embodiment, third part 24c and fourth part 24d respectively overlap shorter sides of electrode body 12. In other words, position regulator 24 overlaps an entire outer edge of electrode body 12.

As has been described above, battery module 1 according to this exemplary embodiment includes the plurality of batteries 2 and the plurality of separators 4. The plurality of batteries 2 are stacked together, and each of the plurality of separators 4 is disposed between the adjoining two of batteries 2 to insulate between the adjoining two of batteries 2. Each of separators 4 includes thermal conduction suppressor 22 and position regulator 24. Thermal conduction suppressor 22 is lower in thermal conductivity than position regulator 24, and suppresses the thermal conduction between the adjoining two of the plurality of batteries 2. Position regulator 24 is greater in rigidity than thermal conduction suppressor 22, and dimension D1 of each of batteries 2 in stacked direction X is equal to or greater than dimension D2 of thermal conduction suppressor 22 in stacked direction X. In this state, position regulator 24 abuts the adjoining two of batteries 2 to regulate the position of the adjoining two of batteries 2 in stacked direction X.

As has been described above, thermal conduction suppressor 22 is sandwiched between the adjoining two of batteries 2. With this configuration, even when battery module 1 is in use and any one of batteries 2 is excessively increased in temperature, the heat is less prone to be conducted to the one that adjoins a corresponding one of batteries 2. Accordingly, a chain of overheating is less prone to occur. Concurrently, with dimension D1 of position regulator 24 in stacked direction X being equal to or greater than dimension D2 of thermal conduction suppressor 22 in stacked direction X, position regulator 24 more reliably abuts outer can 10 of each of batteries 2. With this configuration, it is possible to suppress displacement of each of batteries 2 in stacked direction X. According to this exemplary embodiment, it is possible to suppress the chain of overheating, and concurrently to fix batteries 2 in stacked direction X. Accordingly, it is possible to suppress the degradation in performance of battery module 1.

Further, when each of batteries 2 is increased in dimension in stacked direction X due to expansion of a corresponding one of batteries 2, thermal conduction suppressor 22 is pressed by outer cans 10 of batteries 2 disposed at both sides of the corresponding one. Thermal conduction suppressor 22 is lower in rigidity than position regulator 24, and is thus pressed to be deformed and brought into contact with outer can 10 without clearance. As a result, it is possible to suppress the thermal conduction between the adjoining two of batteries 2 more reliably.

In this exemplary embodiment, each of batteries 2 includes outer can 10, electrode body 12, and output terminal 16. Outer can 10 accommodates electrode body 12 therein, and has output terminal 16 on first surface 10a of outer can 10. Position regulator 24 has center C1 in the first direction, in which first surface 10a and second surface 10b are aligned. Center C1 is placed closer to second surface 10b with respect to center C2 of battery 2 in the first direction. In other words, position regulator 24 is disposed, on the main surface of each of batteries 2, to be biased toward an opposite side of output terminal 16.

Battery 2 has output terminal 16 protruding from first surface 10a of outer can 10. Thus, electrode body 12 accommodated in outer can 10 has its center placed closer to second surface 10b with respect to center C2 of battery 2. Further, in outer can 10, a current collector extends between electrode body 12 and output terminal 16, so that electrode body 12 and output terminal 16 are electrically connected. In this state, even when center C2 of battery 2 corresponds to a center of outer can 10, the center of electrode body 12 is placed closer to second surface 10b with respect to center C2 of battery 2. Accordingly, center C1 of position regulator 24 may be placed closer to second surface 10b with respect to center C2 of battery 2, so that center C1 of position regulator 24 is closer to the center of electrode body 12.

When battery module 1 is in use, the expansion of each of batteries 2 may occur mainly due to expansion of an active material contained in electrode body 12. In other words, in each of batteries 2, the extending part of electrode body 12 is prone to expand. As a more efficient countermeasure to the problem above, center C1 of position regulator 24 may be placed closer to the center of electrode body 12, so that battery 2 is less prone to expand.

Position regulator 24 includes first part 24a and second part 24b. First part 24a is disposed closer to first surface 10a, and second part 24b is disposed closer to second surface 10b. Each of first part 24a and second part 24b is elongated, extending in the second direction intersecting the first direction. Electrode body 12 has a rectangular shape extending in the second direction. When viewed in stacked direction X, first part 24a overlaps longer side 12a of electrode body 12 closer to first surface 10a, and second part 24b overlaps longer side 12b of electrode body 12 closer to second surface 10b. Electrode body 12 has greater deformable amount in an area near its longer side than in an area near its shorter side. As a more efficient countermeasure to the problem above, first part 24a and second part 24b are respectively configured to overlap longer side 12a and longer side 12b, so that electrode body 12 is less prone to be deformed.

Concurrently, thermal conduction suppressor 22 is disposed between first part 24a and second part 24b. With this configuration, space efficiency of thermal conduction suppressor 22 is improved, and separator 4 is less required to be increased in size due to arranging thermal conduction suppressor 22. Here, first part 24a overlaps longer side 12a of electrode body 12 closer to first surface 10a, and second part 24b overlaps longer side 12b of electrode body 12 closer to second surface 10b. Accordingly, it is possible to suppress the deformation of battery 2, and concurrently to increase the area for thermal conduction suppressor 22.

In this exemplary embodiment, each of separators 4 includes through hole 26 penetrating a corresponding one of separators 4 in stacked direction X. Position regulator 24 is disposed to surround through hole 26, and thermal conduction suppressor 22 is disposed inside through hole 26 when viewed in stacked direction X. With this configuration, through hole 26 or position regulator 24 regulates the position of thermal conduction suppressor 22 and thus, thermal conduction suppressor 22 is less prone to be out of the position. As a result, it is possible to suppress the degradation in performance of battery module 1 more reliably. Further, through hole 26 secures the space for accommodating thermal conduction suppressor 22. With this configuration, thermal conduction suppressor 22 is less prone to be excessively pressed, due to expansion of battery 2.

Second Exemplary Embodiment

Figure 7:
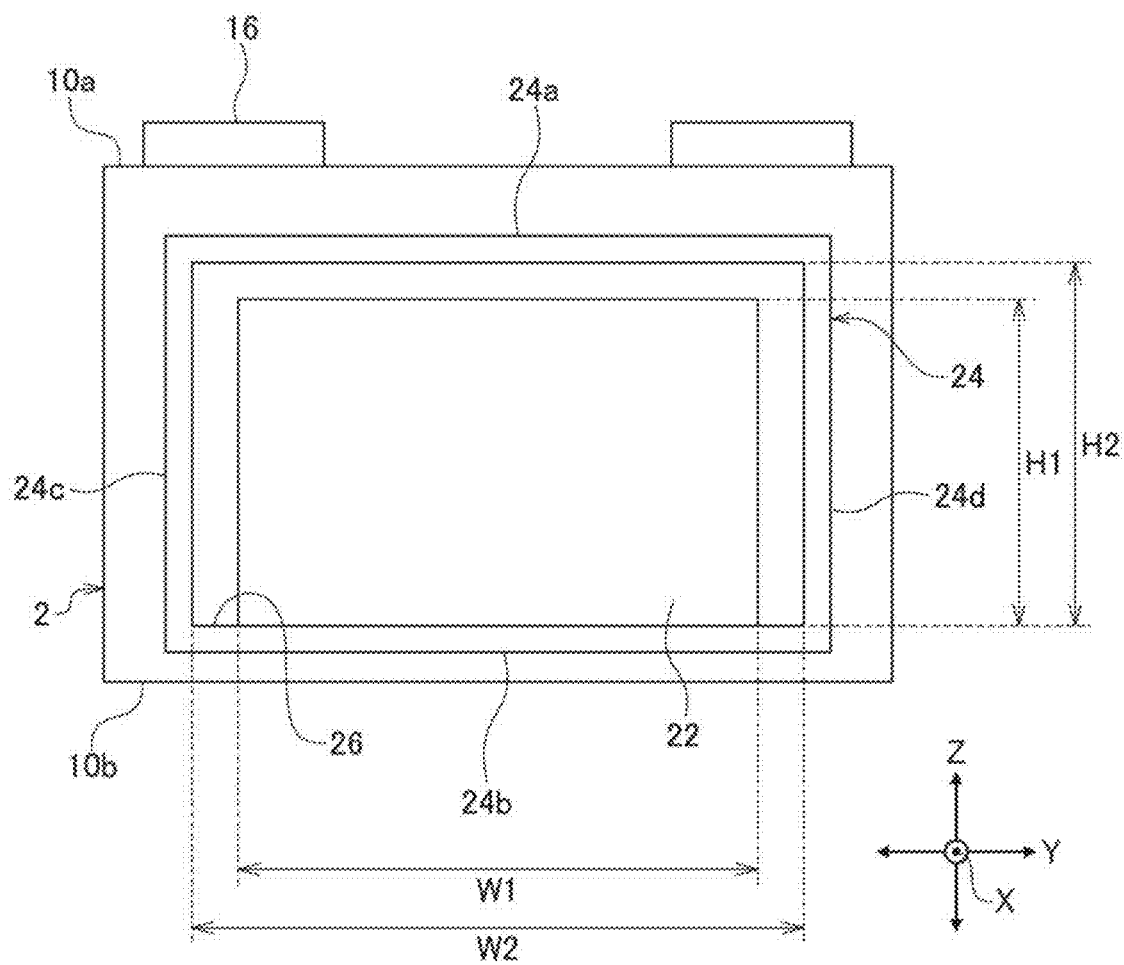
FIG. 7 is a schematic diagram illustrating a dimensional relationship between the thermal conduction suppressor and the position regulator, each included in a battery module according to a second exemplary embodiment.

A second exemplary embodiment has a common configuration with in the first exemplary embodiment, except for a dimensional relationship between a thermal conduction suppressor and a position regulator. This exemplary embodiment will be described below mainly with respect to the differences from the configuration in the first exemplary embodiment, and a detailed description of the common configuration will be briefly described or omitted as appropriate. FIG. 7 is a schematic diagram illustrating the dimensional relationship between the thermal conduction suppressor and the position regulator, each included in a battery module according to the second exemplary embodiment.

Thermal conduction suppressor 22 of this exemplary embodiment has dimension H1 in the first direction. Dimension H1 is smaller than distance H2 between first part 24a and second part 24b. Thus, thermal conduction suppressor 22 has a gap from first part 24a and/or second part 24b. In other words, thermal conduction suppressor 22 has a projected area in stacked direction X, the projected area less than or equal to an opening area of through hole 26. With this configuration, a dimensional tolerance of each of thermal conduction suppressor 22 and position regulator 24, the dimensional tolerance in the first direction, is within an acceptable tolerance range, and thermal conduction suppressor 22 is more reliably disposed between first part 24a and second part 24b. Further, the assembling process of battery module 1 is simplified. Distance H2 corresponds to, for example, a distance in the first direction between the point of first part 24a closest to second part 24b and the point of second part 24b closest to first part 24a. In this exemplary embodiment, the first direction corresponds to vertical direction Z.

In assembling of battery module 1, a positional relationship between thermal conduction suppressor 22 and position regulator 24 is determined based on first part 24a or second part 24b. In a structure illustrated in FIG. 7, the positional relationship is determined based on second part 24b. In other words, thermal conduction suppressor 22 is fixed to the main surface of battery 2, having a bottom side of thermal conduction suppressor 22 in contact with second part 24b. This configuration creates a gap between an upper side of thermal conduction suppressor 22 and first part 24a. As has been described above, thermal conduction suppressor 22 is disposed based on position regulator 24, thereby reducing variation in assembling of battery module 1.

Note that, the positional relationship between thermal conduction suppressor 22 and position regulator 24 may be also determined based on first part 24a. In other words, thermal conduction suppressor 22 may be fixed to the main surface of battery 2, having the upper side of thermal conduction suppressor 22 in contact with first part 24a. This configuration creates a gap between the bottom side of thermal conduction suppressor 22 and second part 24b.

Thermal conduction suppressor 22 of this exemplary embodiment has dimension W1 in the second direction, and dimension W1 is smaller than distance W2 between third part 24c and fourth part 24d. Thus, thermal conduction suppressor 22 has a gap from third part 24c and/or fourth part 24d. With this configuration, a dimensional tolerance of each of thermal conduction suppressor 22 and position regulator 24, the dimensional tolerance in the second direction, is within an acceptable tolerance range, and thermal conduction suppressor 22 is more reliably disposed between third part 24c and fourth part 24d. Further, the assembling process of battery module 1 is simplified. In this exemplary embodiment, the second direction corresponds to horizontal direction Y.

In the structure illustrated in FIG. 7, thermal conduction suppressor 22 and position regulator 24 are disposed such that a center of thermal conduction suppressor 22 in the second direction matches a center of third part 24c and a center of fourth part 24d, each of the centers in the second direction. This configuration creates a gap between a left side of thermal conduction suppressor 22 and third part 24c, and a gap between a right side of thermal conduction suppressor 22 and fourth part 24d. Note that, thermal conduction suppressor 22 and position regulator 24 may be disposed based on third part 24c or fourth part 24d.

Each of exemplary embodiments of the present invention has been described above. Note that, the foregoing exemplary embodiments are simply for purpose of embodying a technical concept of the present invention. It is to be understood that the foregoing exemplary embodiments are not restrictive of the technical scope of the present invention; and thus, any design change, such as change, addition, or removal of constituent elements, may be made without departing from the scope of claims of the present invention. Advantageous effects of a new exemplary embodiment where the design change has been made will naturally fall within the scope of claims of the exemplary embodiments and modifications. In the foregoing exemplary embodiments, for emphasis of contents where these design changes may be made, descriptions such as "of this exemplary embodiment" or "in this exemplary embodiment" are used; however, the design changes may be made without such descriptions. Any combinations of constituent elements above are encompassed within an aspect of the present invention. In the drawings, some part is cross-hatched, but the cross-hatching is not used for purpose of restricting the material of the part.

A number of batteries 2 included in battery module 1 is not particularly limited. Further, each of batteries 2 may include an insulating film such as a shrink tube for covering surfaces of outer can 10.

REFERENCE MARKS IN THE DRAWINGS 1 battery module
2 battery
4 separator
10 outer can
10a first surface
10b second surface
12 electrode body
12a, 12b longer side
16 output terminal
22 thermal conduction suppressor
24 position regulator
24a first part
24b second part
26 through hole

The invention claimed is:

1. A battery module comprising:
 a plurality of batteries stacked together in a stacked direction; and
 a separator disposed between an adjoining two of the plurality of batteries and configured to insulate between the adjoining two of the plurality of batteries, wherein
 the separator includes a thermal conduction suppressor and a position regulator,
 the position regulator defines a through hole extending through the separator in the stacked direction,
 the thermal conduction suppressor is disposed inside the through hole of the position regulator when viewed in the stacked direction,
 a thickness of the thermal conduction suppressor in an uncompressed state thereof is shorter than a depth of the through hole of the position regulator in the stacked direction,
 the thermal conduction suppressor is configured:
 to have a lower thermal conductivity than a thermal conductivity of the position regulator; and
 to suppress thermal conduction between the adjoining two of the plurality of batteries, and
 the position regulator is configured:
 to abut the adjoining two of the plurality of batteries; and
 to regulate a position of each of the adjoining two of the plurality of batteries in the stacked direction.

2. The battery module according to claim 1, wherein each of the plurality of batteries includes:
 an outer can;
 an electrode body accommodated in the outer can; and
 an output terminal provided on a first surface of the outer can, and
 the position regulator has a center in a first direction, in which the first surface and a second surface opposing the first surface are aligned to each other, the center positioned closer to the second surface with respect to a center of a corresponding one of the plurality of batteries in the first direction.

3. The battery module according to claim 2, wherein the position regulator includes a first part disposed closer to the first surface, and a second part disposed closer to the second surface, each of the first part and the second part having an elongated shape and extending in a second direction intersecting the first direction,
 the electrode body has a rectangular shape extending in the second direction, and
 when viewed in the stacked direction of the plurality of batteries, the first part is configured to overlap a longer side of the electrode body, the longer side closer to the first surface, and the second part is configured to overlap a longer side of the electrode body, the longer side of the electrode body closer to the second surface.

4. The battery module according to claim 3, wherein the thermal conduction suppressor is disposed between the first part and the second part.

5. The battery module according to claim 4, wherein the thermal conduction suppressor has a dimension in the first direction, the dimension smaller than a distance between the first part and the second part.

6. The battery module according to claim 1, wherein the separator further includes a frame, the frame including a through hole penetrating the separator in the stacked direction of the plurality of batteries, the position regulator is disposed inside the through hole of the frame.

7. The battery module according to claim 1, wherein the position regulator comprises a frame-shaped member protruding from a remainder of the separator toward main surfaces of the adjoining two of the plurality of batteries on both sides of the separator in the stacked direction.

8. The battery module according to claim 1, wherein the separator includes a flat surface portion that has a same rectangular contour as main surfaces of the plurality of batteries, and is interposed between the main surfaces of the adjoining two of the plurality of batteries, wherein the position regulator comprises a frame-shaped member protruding from the flat surface portion toward the main surfaces of the adjoining two of the plurality of batteries on both sides of the separator in the stacked direction.

9. A battery module comprising:
a plurality of batteries stacked together in a stacked direction; and
a separator disposed between an adjoining two of the plurality of batteries and configured to insulate between the adjoining two of the plurality of batteries, wherein
the separator includes a thermal conduction suppressor and a position regulator,
the position regulator defines a through hole extending through the separator in the stacked direction,
the thermal conduction suppressor is disposed inside the through hole of the position regulator when viewed in the stacked direction,
the thermal conduction suppressor is spaced apart from an inner perimeter of the through hole so as to form an air gap therebetween at least in a direction perpendicular to the stacked direction,
the thermal conduction suppressor is configured:
to have a lower thermal conductivity than a thermal conductivity of the position regulator; and
to suppress thermal conduction between the adjoining two of the plurality of batteries, and
the position regulator is configured:
to have a dimension in the stacked direction, the dimension equal to or greater than a dimension of the thermal conduction suppressor in the stacked direction;
to abut the adjoining two of the plurality of batteries; and
to regulate a position of each of the adjoining two of the plurality of batteries in the stacked direction.

10. The battery module according to claim 9, wherein each of the plurality of batteries includes:
an outer can;
an electrode body accommodated in the outer can; and
an output terminal provided on a first surface of the outer can, and
the position regulator has a center in a first direction, in which the first surface and a second surface opposing the first surface are aligned to each other, the center positioned closer to the second surface with respect to a center of a corresponding one of the plurality of batteries in the first direction.

11. The battery module according to claim 10, wherein the position regulator includes a first part disposed closer to the first surface, and a second part disposed closer to the second surface, each of the first part and the second part having an elongated shape and extending in a second direction intersecting the first direction,
the electrode body has a rectangular shape extending in the second direction, and
when viewed in the stacked direction of the plurality of batteries, the first part is configured to overlap a longer side of the electrode body, the longer side closer to the first surface, and the second part is configured to overlap a longer side of the electrode body, the longer side of the electrode body closer to the second surface.

12. The battery module according to claim 11, wherein the thermal conduction suppressor is disposed between the first part and the second part.

13. The battery module according to claim 12, wherein the thermal conduction suppressor has a dimension in the first direction, the dimension smaller than a distance between the first part and the second part.

14. The battery module according to claim 9, wherein the separator further includes a frame, the frame including a through hole penetrating the separator in the stacked direction of the plurality of batteries,
the position regulator is disposed inside the through hole of the frame.

15. The battery module according to claim 9, wherein the position regulator comprises a frame-shaped member protruding from a remainder of the separator toward main surfaces of the adjoining two of the plurality of batteries on both sides of the separator in the stacked direction.

16. The battery module according to claim 9, wherein the separator includes a flat surface portion that has a same rectangular contour as main surfaces of the plurality of batteries, and is interposed between the main surfaces of the adjoining two of the plurality of batteries, wherein the position regulator comprises a frame-shaped member protruding from the flat surface portion toward the main surfaces of the adjoining two of the plurality of batteries on both sides of the separator in the stacked direction.

* * * * *